B. MULLIN.
AIR BRAKE FOR LOCOMOTIVE CRANES.
APPLICATION FILED MAR. 14, 1916.
1,221,079.
Patented Apr. 3, 1917.
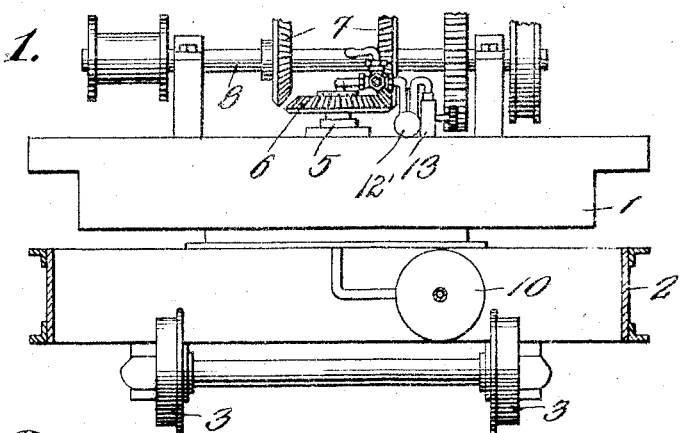
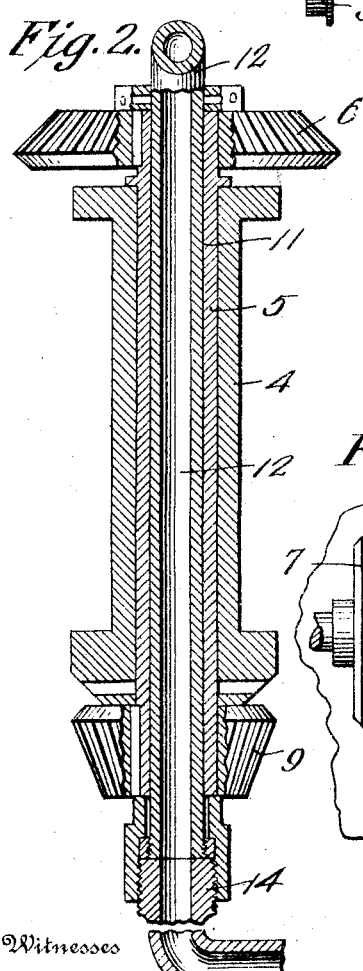
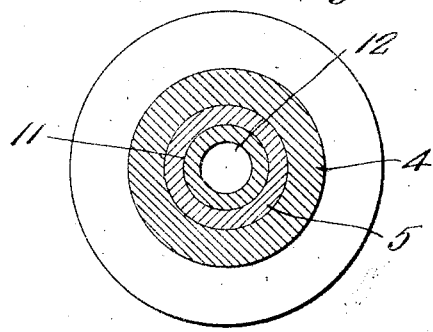
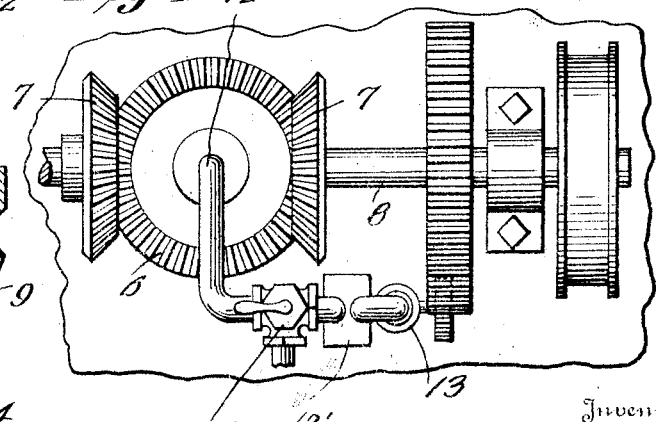
Inventor
B. Mullin,
By Chandler & Chandler
Attorneys
Witnesses
James F. Crown

UNITED STATES PATENT OFFICE.

BENJAMIN MULLIN, OF JERSEY CITY, NEW JERSEY.

AIR-BRAKE FOR LOCOMOTIVE-CRANES.

1,221,079.　　　　　Specification of Letters Patent.　　Patented Apr. 3, 1917.

Application filed March 14, 1916.　Serial No. 84,200.

*To all whom it may concern:*

Be it known that I, BENJAMIN MULLIN, a citizen of the United States, residing at Jersey City, in the county of Hudson, State of New Jersey, have invented certain new and useful Improvements in Air-Brakes for Locomotive-Cranes; and I do hereby declare the following to be a full, clear, and exact description of the invention, such as will enable others skilled in the art to which it appertains to make and use the same.

This invention relates to an air brake for locomotive cranes.

An object of the invention resides in the provision of an air brake mechanism by means of which the wheels of a locomotive crane may be locked.

A further object of the invention resides in so constructing the device that it will operate irrespective of the position of the rotating base with relation to the car body.

A further object of the invention resides in the provision of a controlling valve on the rotating base within convenient reach of the operator so that the brakes may be applied or released.

A still further object of the invention resides in the provision of a novel mechanism for transmitting the air from the pump to the brake mechanism.

With these and other objects in view, such as will appear as my description progresses, my invention comprises the combination and arrangement of parts as set forth in and falling within the scope of the appended claim.

In the drawing:—

Figure 1 is an elevational view of my device showing the same mounted on a crane, portions of the latter being shown in section however;

Fig. 2 is a fragmental sectional view showing the manner in which the air conducting pipe passes from the rotating base to the car body;

Fig. 3 is a horizontal sectional view through the center or king pin of the rotating base, and Fig. 4 is a fragmental detail.

In the drawing I have illustrated a conventional form of locomotive crane and have shown only such parts thereof as are necessary to the understanding of my invention. This crane includes broadly a rotating base 1 and a car body 2, the latter being supported by suitable wheels 3. This base 1 is rotatably mounted on a center or king pin 4 carried by the body 2 through which pin a travel shaft 5 extends on the upper end of which a beveled gear 6 is secured, which gear meshes with beveled drive gears 7 on the actuating shaft 8. On the lower end of the travel shaft 5 is secured a beveled gear 9 which meshes with a gear on the car body 2 so that the base may be rotated on the body. The gearing used and above described is similar to that ordinarily used in locomotive cranes and a more detailed description is therefore not deemed necessary.

In order that the movement of the wheels may be arrested I have provided the same with brakes, not shown, which brakes are applied by means of suitable operating mechanism 10 which is indicated conventionally as the details of construction form no part of the present invention. It is only essential that this operating mechanism be actuated by air.

In order that the said mechanism may be supplied with air I have formed a hole 11 in the travel shaft 5 which extends axially thereof and from end to end. Extending through this hole 11 is a pipe 12 which pipe likewise extends through axially arranged holes in the gears 6 and 9 and is connected at one end to the brake operating mechanism 10. The upper portion of this pipe extends above the gear 6 which is located above the brake operating mechanism 10. The upper portion of this pipe extends above the gear 6 which is located above the rotating base and is connected to a suitable storage tank 12' and a pump 13, which pump is geared to the operating mechanism of the base. Interpolated in this pipe 12 between the tank and the gear 6 is a three-way valve 12'' of any desired construction which valve is located within convenient reach of the operator and on the rotating base 1.

The lower end of the pipe 12 is provided with a swiveled connection 14 so that when the base rotates on the car body the portion of the pipe which extends upwardly through the travel shaft may rotate therewith. It will thus be seen that I have extended the air supply pipe through the center or king pin on which the base is rotatably mounted so that the brakes may be applied irrespective of the position of the base with relation to the car body.

While I have illustrated and described a particular embodiment of my invention it has merely been for the sake of convenience and I do not wish to be limited to that particular embodiment as it is obvious that numerous changes may be made in the minor details of construction without departing from the spirit of the invention or exceeding the scope of the claim.

What I claim, is:—

The combination with a locomotive crane including a car body, of a king pin extending upwardly therefrom, a travel shaft rotatably mounted in the king pin, a rotatable base mounted on the king pin, mechanism for applying brakes to the car wheels, a pipe extending longitudinally through the travel shaft, and a pump mounted on the base rigidly and connected to the upper end of the pipe, the lower end of the pipe being connected to the brake applying mechanism.

In testimony whereof, I affix my signature, in the presence of two witnesses.

BENJAMIN MULLIN.

Witnesses:
RICHARD H. DUFF,
GEO. I. KELLY.